US010084828B2

(12) United States Patent
Sorin et al.

(10) Patent No.: US 10,084,828 B2
(45) Date of Patent: Sep. 25, 2018

(54) SOCIAL-CHRONOGRAPHIC-GEOGRAPHIC MEDIA FILE BROWSING SYSTEM AND METHOD

(71) Applicant: RealNetworks, Inc., Seattle, WA (US)

(72) Inventors: Sorin, Seattle, WA (US); Christopher Carl Petersen, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 23 days.

(21) Appl. No.: 13/683,958

(22) Filed: Nov. 21, 2012

(65) Prior Publication Data

US 2013/0151988 A1 Jun. 13, 2013

Related U.S. Application Data

(60) Provisional application No. 61/563,019, filed on Nov. 22, 2011.

(51) Int. Cl.
| | | |
|---|---|---|
| *H04L 29/06* | (2006.01) | |
| *H04W 4/02* | (2018.01) | |
| *H04W 4/021* | (2018.01) | |
| *H04W 4/21* | (2018.01) | |

(52) U.S. Cl.
CPC ........ *H04L 65/403* (2013.01); *H04L 65/1069* (2013.01); *H04L 65/4084* (2013.01); *H04W 4/02* (2013.01); *H04W 4/21* (2018.02)

(58) Field of Classification Search
CPC .......... G06F 3/04812; G06F 17/30867; G06F 17/30241; G06F 17/3087; G06F 3/048; H04L 67/22; H04L 67/18; G06Q 50/01; H04W 4/18–4/185; H04W 4/206; H04W 4/02–4/046
See application file for complete search history.

(56) References Cited

U.S. PATENT DOCUMENTS

| 6,883,146 | B2* | 4/2005 | Prabhu et al. ................ 715/854 |
| --- | --- | --- | --- |
| 7,725,477 | B2* | 5/2010 | Wiseman ...................... 707/758 |
| 8,655,873 | B2* | 2/2014 | Mitchell .............. H04W 4/185 |
| | | | 707/724 |
| 2007/0011150 | A1* | 1/2007 | Frank ................ G06F 17/30241 |
| 2007/0060112 | A1* | 3/2007 | Reimer ............. G06F 17/30026 |
| | | | 455/414.2 |
| 2007/0143345 | A1* | 6/2007 | Jones ................ G06F 17/30241 |
| 2008/0140309 | A1* | 6/2008 | Jendbro ............ G01C 21/3614 |
| | | | 701/533 |
| 2009/0319472 | A1* | 12/2009 | Jain ..................... G06F 17/3025 |
| 2011/0276423 | A1* | 11/2011 | Davidson ..................... 705/26.1 |
| 2012/0221687 | A1* | 8/2012 | Hunter et al. ................ 709/219 |

(Continued)

*Primary Examiner* — Jennifer To
*Assistant Examiner* — Liang Li
(74) *Attorney, Agent, or Firm* — Seed IP Law Group LLP

(57) ABSTRACT

Users are able to browse a digital-media content based on social-graph-related criteria, time-related criteria, and geo-location-related criteria. A social-chronographic-geographic media file browsing system builds a social-chronographic-geographic media query and retrieves digital-media content (and associated metadata) based on a given user's search criteria. In accordance with various embodiments, the social-chronographic-geographic media file browsing system retrieves an interactive map from cartographic data provider and then places a graphical media control on the interactive map according to the provided geolocation-related criterion.

8 Claims, 6 Drawing Sheets

(56) References Cited

U.S. PATENT DOCUMENTS

| | | | |
|---|---|---|---|
| 2013/0016123 A1* | 1/2013 | Skarulis | 345/633 |
| 2013/0055088 A1* | 2/2013 | Liao et al. | 715/730 |
| 2013/0080922 A1* | 3/2013 | Elias et al. | 715/753 |
| 2013/0110631 A1* | 5/2013 | Mitchell | H04W 4/185 |
| | | | 705/14.58 |

* cited by examiner

Fig. 5

SOCIAL-CHRONOGRAPHIC-GEOGRAPHIC MEDIA FILE BROWSING SYSTEM AND METHOD

CROSS REFERENCE TO RELATED APPLICATIONS

This application claims the benefit of priority to U.S. Provisional Patent Application No. 61/563,019; titled "Social-Chronographic-Geographic Media File Browsing System and Method"; filed Nov. 22, 2011; and naming inventors Sorin and Chris Petersen. The above-cited application is incorporated herein by reference in its entirety, for all purposes.

FIELD

The present disclosure relates to sharing and/or browsing media files, and more particularly to sharing and/or browsing media files according to time, geographic location, and social-graph.

BACKGROUND

Many social networking services and/or media file sharing services offer platforms for many individuals to share the happenings of their daily lives by way of digital-media content. Social networking services often include a website that focuses on building and/or reflecting social relations among people who, for example, share common interests, activities, and/or geographic location. Additionally, media sharing services are often platforms that allow users to aggregate, upload, compress, host, and/or distribute digital-media content. Many social networking services also maintain a platform for sharing and/or browsing digital-media content. That being said, most platforms employed by social networking services and/or media sharing services limit the number of ways users are allowed to browse digital-media.

Many social networking services and/or media sharing services allow users to employ search filters to browse digital-media content. Such search filters may include searching by at most one or two criteria, such as social-graph-related criteria, (e.g., by a group of friends or co-workers); by geolocation-related criteria, (e.g., by a physical location or locations); or by time-related criteria, (e.g., by a specified date, time, and/or event). However, some users may want to browse shared digital-media content using a combination of three or more search filters.

For example, Facebook.com, provided by Facebook, Inc. of Palo Alto, Calif. ("Facebook") allows its users to browse shared digital-media content, but users may browse shared digital-media content associated with only a given user, or they may browse shared digital-media content associated with multiple users but for only a single event. However, these browsing limitations may be a problem, as some users may wish to browse shared digital-media content shared by multiple users for a given time-related criterion, other users may wish to browse shared digital-media content of a given user associated with multiple events, while still other users may wish to browse shared digital-media content associated with multiple users for a given time range.

By way of another example, YouTube.com, provided by Google, Inc. of Menlo Park, Calif. ("YouTube") allows users to access digital video content, and allows users to make a user profile in order to share digital videos that the user creates and/or uploads to the site. But YouTube lacks the capability to filter shared digital-media content for a given social group, and YouTube does not allow users to browse shared digital-media content by a specified geolocation-related criterion. Lacking social networking functionality is a problem to some users, as they may wish to browse shared digital-media content associated with a specified group of users for an intended social graph. Or some users may wish to browse digital-media content shared by users of a specified geographic region.

Additionally, some social networking services and/or media sharing services allow users to view their social networks and/or display shared digital-media content via an interactive map. However, most social networking services employing interactive maps are limited to displaying markers at locations specified by a given person in the viewer's social network. For example, BlooSee.com, provided by BlooSee, Inc. of San Francisco, Calif. ("BlooSee"), is an ocean mapping web site where sailors, divers, surfers, and other seafarers share information and knowledge about the oceans by tagging locations on an interactive map. However, BlooSee does not allow users to filter tagged locations by any criteria other than by geolocation-related criterion and/or social-graph-related criterion.

Likewise, other geolocation driven media sharing services may allow viewers to browse, by geolocation-related criteria, digital-media that is shared by a given user. However, these services fail to allow viewers to browse shared digital-media content by time-related criteria. For instance, Panoramio.com, provided by Google, Inc. of Menlo Park, Calif. ("Panoramio"), allows users to browse uploaded photos as a layer on an interactive map. However, Panoramio is limited to browsing shared digital-media content associated with a geolocation. Restricting the browsing filters to geolocation-related criteria alone may be a problem in that some users may wish to browse shared digital-media content using multiple search filters in addition to a specified geolocation-related criterion.

Further, many social networking services do not offer users the ability to browse digital-media by a chosen time-related criterion. For instance, many social networking services, such as Facebook and the like, allow users to label shared digital-media content with a time and/or date, but do not allow users to search for shared digital-media content by the labeled time and/or date. However, some users may wish to browse shared digital-media content by searching for a specified time and/or date.

Moreover, many social networking services do not offer users the ability to browse digital-media by a specified time-range. For example, liveshare.com, provided by Cooliris, Inc. of Palo Alto, Calif. allows users to share digital photos in real-time (i.e., sharing digital-media during the present time), but does not allow users to browse shared digital-media content by specifying a time range that does not include the present time and/or date. However, some users may wish to browse shared digital-media content by a specified time-related criterion that does not include present time and/or date. Additionally, liveshare.com does not allow users to browse shared digital-media by a specified geolocation-related criterion. However, other users may wish to browse shared digital-media content by a specified time range and by a specified geolocation-related criterion.

BRIEF DESCRIPTION OF THE DRAWINGS

FIG. 5 illustrates an exemplary media file upload graphical user interface displaying on user device, in accordance with one embodiment.

DESCRIPTION

Figure 1:
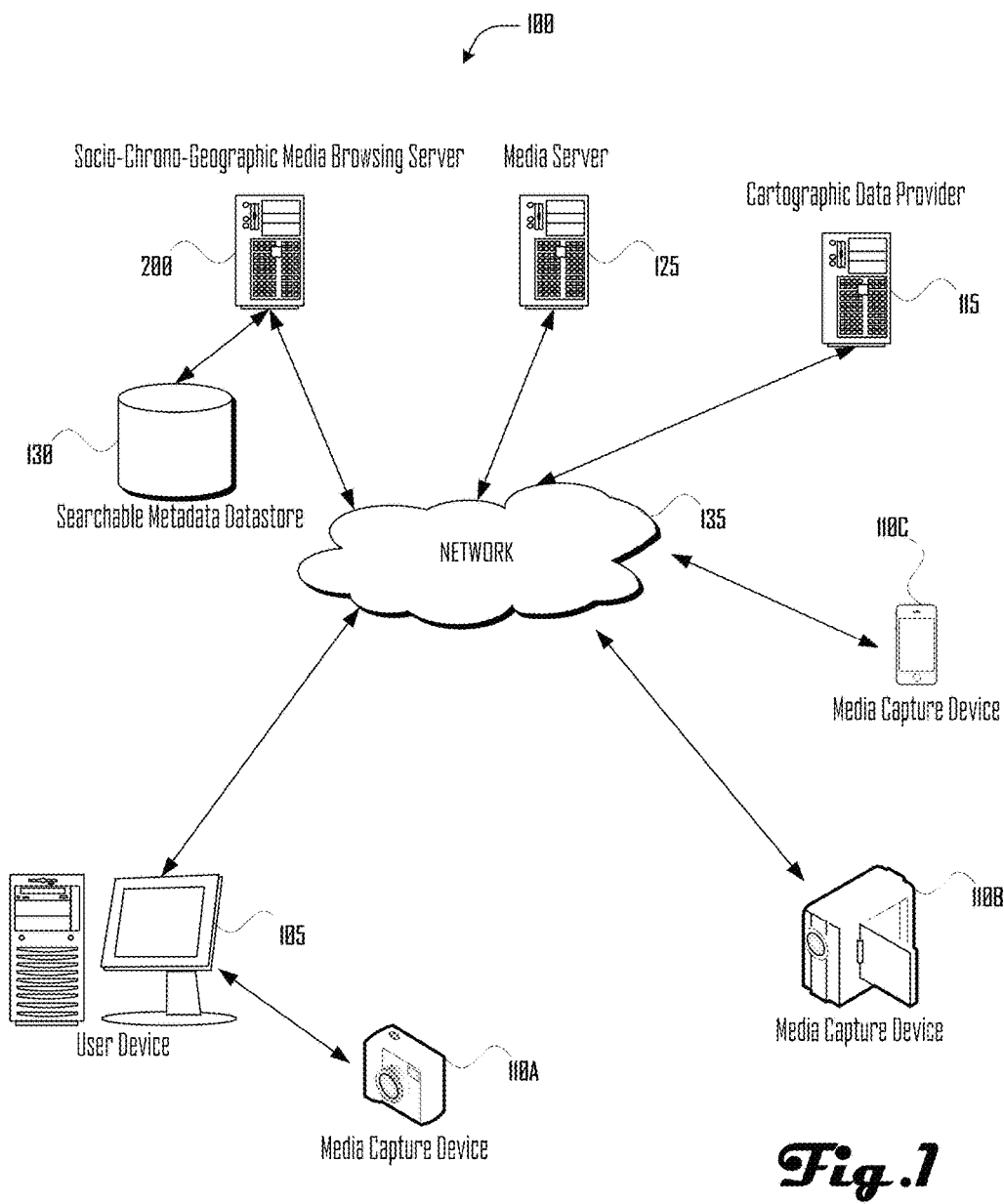
FIG. 1 is an exemplary social-chronographic-geographic media file browsing system in accordance with one embodiment.

In accordance with various embodiments, a social-chronographic-geographic media file browsing system may provide users with the ability to browse a digital-media content based on social-graph-related criteria, time-related criteria, and geolocation-related criteria. In accordance with various embodiments, the social-chronographic-geographic media file browsing system builds a social-chronographic-geographic media query (see discussion of FIG. 4 below) and retrieves digital-media content (and associated metadata) based on a given user's search criteria. In accordance with various embodiments, the social-chronographic-geographic media file browsing system retrieves an interactive map from cartographic data provider and then places a graphical media control on the interactive map according to the provided geolocation-related criterion (see discussion of FIG. 4 below).

The detailed description that follows is represented largely in terms of processes and symbolic representations of operations by conventional computer components, including a processor, memory storage devices for the processor, connected display devices, and input devices. Furthermore, these processes and operations may utilize conventional computer components in a heterogeneous distributed computing environment, including remote file Servers, computer Servers, and memory storage devices. Each of these conventional distributed computing components is accessible by the processor via a communication network.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

FIG. 1 illustrates an exemplary socio-chrono-geographic media browsing system 100, in which socio-chrono-geographic media browsing server 200 collects digital-media content and organizes the content by social-graph-related criteria, time-related criteria, and geolocation-related criteria. In various embodiments, socio-chrono-geographic media browsing server 200 may be connected to searchable metadata data store 130, media server 125, cartographic data provider 115, media capture devices 110B-C, and/or user device 105 via network 135. In various embodiments, network 135 may include the Internet, a local area network ("LAN"), a wide area network ("WAN"), a cellular data network, and/or other data network.

In accordance with various embodiments, users associated with media capture devices 110B-C, are enabled to capture digital images (e.g., digital photos, digital video, and the like) and upload the captured digital images to socio-chrono-geographic media browsing server 200 via network 135. Media capture devices 110B-C may be equipped with geolocation or navigation circuitry, such as a Global Positioning System ("GPS") receiver, as well as software to convert signals thereby received into a geolocation (within some margin of error). In other embodiments, alternate positioning systems may be employed, such as wireless network signal-strength-based indoor positioning systems, hybrid systems combining global and local positioning systems, and the like. However, in various embodiments, geolocation information may come from other sources including an IP address, Wi-Fi and/or Bluetooth MAC address, radio-frequency identification ("RFID"), Wi-Fi connection location, GSM/CDMA cell IDs, and the like. In various embodiments, media capture devices 110B-C may include mobile cellular phones (e.g., "smartphones"), video cameras, digital photo cameras, MP3 players, and/or any other device that can capture/record, store, and/or transfer digital media via network 135.

In accordance with various embodiments, user device 105 may be enabled to upload digital-media content to socio-chrono-geographic media browsing server 200 via network 135, and may be associated with one or more media capture devices (e.g., media capture device 110A). In various embodiments, user device 105 may be any general purpose computer including a desktop computer, laptop, nettop, netbook, tablet personal computer, pocket pc, or any other physical or logical device capable of storing and/or transferring digital media via network 135.

In accordance with various embodiments, media capture device 110A is able to connect and/or upload digital-media content to user device 105. In some embodiments, media capture device 110A may be a device that on its own is not enabled to connect to network 135, and thus is unable to upload digital-media content to socio-chrono-geographic media browsing server 200 without the use of user device 105. On the other hand, in various embodiments, media capture device 110A may be capable of connecting to network 135 without the use of user device 105. However, media capture device 110A may also have the functionality to connect to user device 105. Additionally, in various embodiments, media capture device 110A may also be equipped with geolocation and/or navigation circuitry as similarly discussed with media capture devices 110B-C above. In various embodiments, media capture device 110A may include mobile cellular phones (e.g., "smartphones"), video cameras, tablet computers, digital photo cameras, MP3 players, and/or any other device that can capture/record and/or store digital media.

In addition to being capable of providing digital media content to socio-chrono-geographic media browsing server 200, in various embodiments, user device 105 and/or media capture devices 110A-C may also be enabled to browse digital-media files by accessing socio-chrono-geographic media browsing server 200.

In accordance with various embodiments, media server 125 provides digital-media content and/or social-graph data to socio-chrono-geographic media browsing server 200. In accordance with various embodiments, media server 125 may be any computer device that is capable of retaining/recording digital data and/or serve requests to other computer applications (e.g., client devices).

In alternate embodiments, some or all of the functionality provided by media server 125 may instead be accomplished using a computer storage device and/or recording medium that is physically connected to socio-chrono-geographic media browsing server 200. In various embodiments, media server 125 may communicate with socio-chrono-geographic media browsing server 200 via network 135, a storage area network ("SAN"), a high-speed serial bus, and/or via other suitable communication technology. Additionally, in various embodiments, media server 125 may be operated by a third-party social networking service and/or media file sharing service that may provide an application programming interface ("API") to enable access to a given user's social-graph and/or shared digital-media content.

In various embodiments, searchable metadata data store 130 stores metadata associated with digital-media files. Searchable metadata data store 130 may be specially optimized to access geolocation data in accordance with various embodiments. In some embodiments, searchable metadata data store 130 may also store other information related to user accounts and/or devices. In accordance with various embodiments, searchable metadata data store 130 may be any computer storage device and/or recording medium that is able to store and retrieve digital data.

In various embodiments, cartographic data provider 115 may provide socio-chrono-geographic media browsing server 200 with an interactive map. In various embodiments, cartographic data provider 115 may be operated by a third-party service that generates maps and/or provides map-based services, including Google Maps (provided by Google, Inc. of Menlo Park, Calif.), Bing Maps (provided by Microsoft Corp. of Redmond, Wash.), OpenStreetMap (provided by OpenStreetMap Foundation of West Midlands, United Kingdom), and the like. In some embodiments, socio-chrono-geographic media browsing server 200 and cartographic data provider 115 may reside on one physical or logical computer device or hardware system (not shown). In various embodiments, socio-chrono-geographic media browsing server 200 may perform some or all of the functions of cartographic data provider 115. In such embodiments, an interactive map may be provided by socio-chrono-geographic media browsing server 200.

In some embodiments, other servers and/or devices (not shown) may also be present. For example, in many embodiments, multiple additional media capture devices and/or user devices may be present. In various embodiments, the functions of metadata data store 130, media server 125, socio-chrono-geographic media browsing server 200, and/or cartographic data provider 115, in any combination, may reside on one physical or logical computer device or hardware system. In some other embodiments, geolocation data may be manually entered by a user via user device 105 and/or media capture devices 110A-C.

Figure 2:
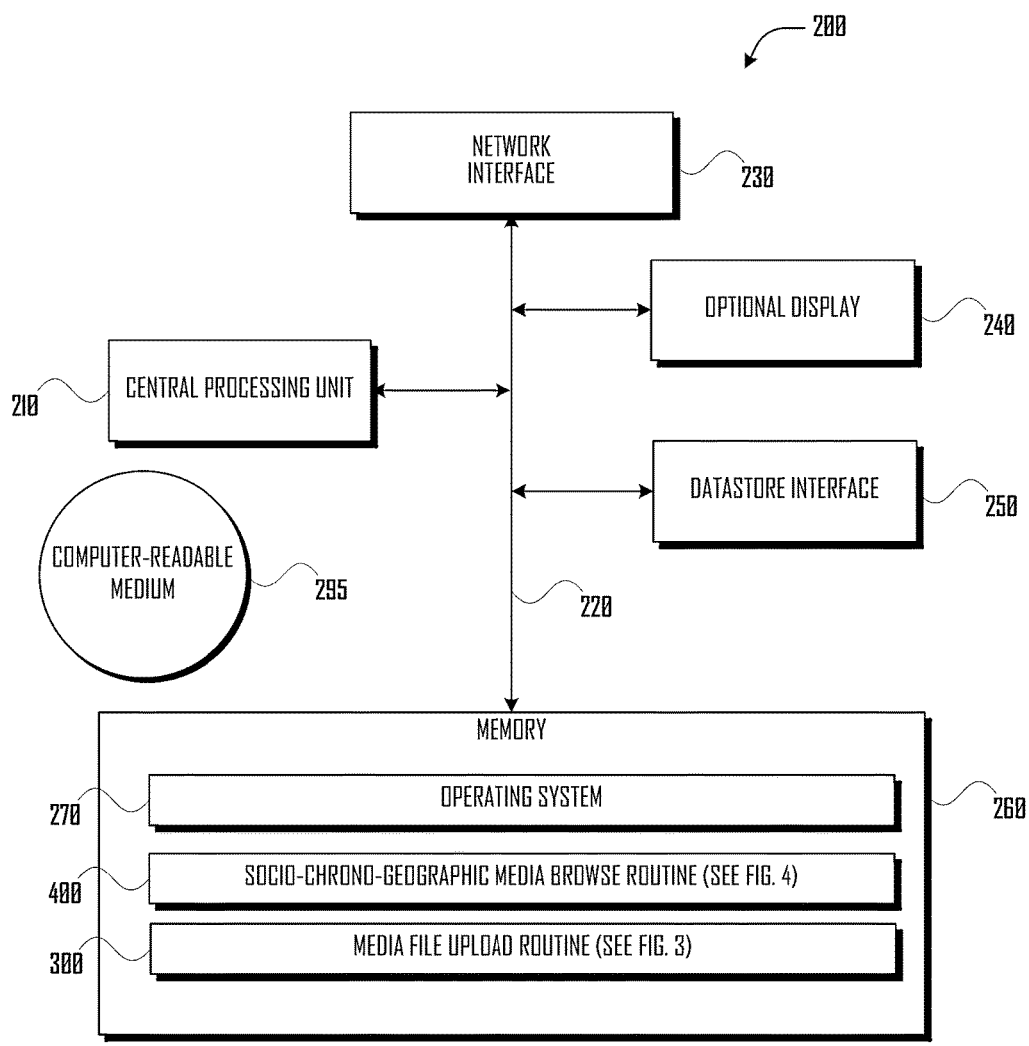
FIG. 2 illustrates several components of an exemplary socio-chrono-geographic media browsing server, in accordance with one embodiment.

FIG. 2 illustrates several components of an exemplary a socio-chrono-geographic media browsing server 200, in accordance with one embodiment. In some embodiments, socio-chrono-geographic media browsing server 200 may include many more components than those shown in FIG. 2. However, it is not necessary that all of these generally conventional components be shown in order to disclose an illustrative embodiment. As shown in FIG. 2, socio-chrono-geographic media browsing server 200 includes a network interface 230 for connecting to the network 135.

Socio-chrono-geographic media browsing server 200 also includes a central processing unit 210, an optional display 240, a data store interface 250, and a memory 260, all interconnected along with the network interface 230 via bus 220. The memory 260 generally comprises a random access memory ("RAM"), a read only memory ("ROM"), and a permanent mass storage device, such as a disk drive. The memory 260 stores program code for a socio-chrono-geographic media browse routine 400 (see FIG. 4, discussed below) and a media file upload routine 300 (see FIG. 3, discussed below). In addition, memory 260 also stores an operating system 270. These software components may be loaded into memory 260 of the socio-chrono-geographic media browsing server 200 using a drive mechanism (not shown) associated with a non-transient computer readable storage medium 295, such as a floppy disc, tape, DVD/CD-ROM drive, memory card, or the like. In some embodiments, software components may also be loaded via the network interface 230, rather than via a computer readable storage medium 295.

Socio-chrono-geographic media browsing server 200 also communicates via data store interface 250 with searchable metadata data store 130. In various embodiments, data store interface 250 may comprise a storage area network ("SAN"), a high-speed serial bus, and/or via other suitable communication technology. In various embodiments, socio-chrono-geographic media browsing server 200 may communicate with searchable metadata data store 130 via network interface 230.

Figure 3:
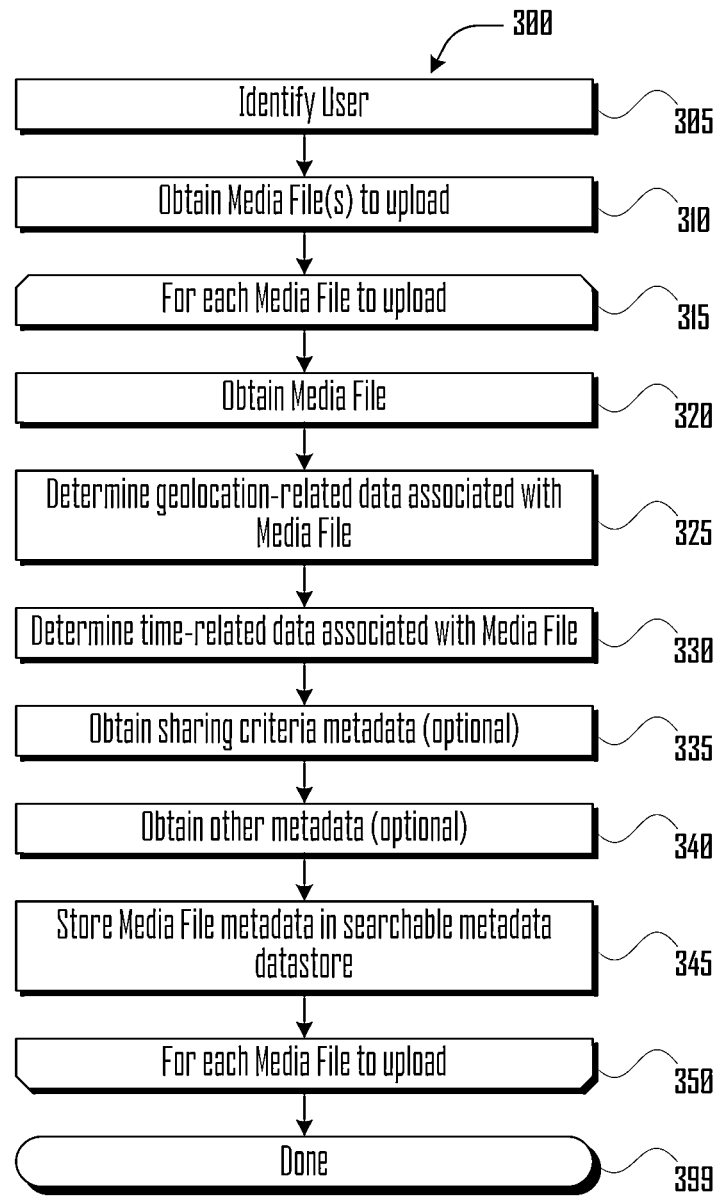
FIG. 3 illustrates an exemplary media file upload routine, in accordance with one embodiment.

FIG. 3 shows a routine 300 for uploading a media file by a given user, in accordance with one embodiment. In block 305, routine 300 identifies and/or authenticates the user requesting to upload one or more digital-media files. In many embodiments, identifying and/or authenticating a given user may include collecting personal identifying information (e.g., name, age, place of residence, and the like), social-graph data (e.g., mapping the relationships between users within a given social network), and other like data that identifies a given user.

For example, in one embodiment, block 305 may obtain from a user device and/or media capture device a user identifier, user/password combination, cookie, certificate, and/or other identity and/or authentication token. In various embodiments, block 305 may identify a user by obtaining user information data that is stored in searchable metadata data store 130 (see discussion of FIG. 1 above). In various embodiments, block 305 may identify a user by obtaining user information via a social networking service and/or media sharing service. In other embodiments, the user information may be obtained via another on- or off-line data-collecting interface.

In block 310, routine 300 obtains one or more media file(s) to upload. In various embodiments, the identified user may be able to select for uploading, one or more media files that are stored on his or her local user device and/or media capture device (see discussion of FIG. 1 above). In various embodiments, any number of graphical user interfaces ("GUIs") may be employed to allow the identified user to choose at least one media file to be uploaded (e.g., "file select" in HTML; "JUpload" using a Java Applet; "FancyUpload" and/or "Uploadify" using JavaScript; and/or other suitable custom-built file selection and uploading program interface). In other embodiments, routine 300 may obtain a media file by capturing a stream of media from the identified user's media capture device, and storing the captured media on a data storage device associated with socio-chrono-geographic media browsing server 200.

In various embodiments, the identified user may access one or more digital-media files that are already uploaded to, or otherwise associated with, a social networking service and/or media sharing service. In many embodiments, digital-media files may be selected from a third-party social networking service and/or media sharing service that may be accessed via an API provided by the third-party service.

Beginning in opening loop block 315, routine 300 processes each media file to upload in turn. In block 320, routine 300 obtains the user selected digital-media file. In various embodiments, block 320 may employ a standard uploading protocol (e.g., File Transfer Protocol ("FTP"), Trivial File Transfer Protocol ("TFTP"), HTML's "POST" method, SSH File Transfer Protocol ("SFTP"), and the like) to obtain the current digital-media file from a given user. In various embodiments, block 320 may obtain a selected media file from a social networking service and/or media sharing service, as discussed above. In some embodiments, as discussed above, block 320 may obtain a captured media stream from the identified user's media capture device.

In block 325, routine 300 determines geolocation-related data associated the current digital-media file. In various embodiments, block 325 may determine geolocation-related data of the current digital-media file by obtaining metadata recorded by a media capture device and encoded in the current digital-media file. In many embodiments, the geolocation-related data associated with the current digital-media file may be the GPS coordinate(s), geographic coordinate(s) (e.g., latitude and longitude), and/or Cartesian coordinate(s) where the digital-media was captured.

In many embodiments, a standard metadata encoding format may be used to encode a digital-media file with its associated geolocation-related data (e.g., exchangeable image file format ("Exif"), Extensible Metadata Platform ("XMP"), IPTC Information Interchange Model, and the like). In such embodiments, block 325 may determine geolocation-related data by parsing, or otherwise obtaining, the metadata encoded within the digital-media file.

However, in some embodiments, the current digital-media file may not employ a standard metadata encoding format, in which case, block 325 may obtain geolocation-related data by accessing geolocation-related data from the identified user's media capture device and/or user device (e.g., by accessing the media capture device's GPS data, see discussion at above). Additionally, in various embodiments, block 325 may allow the media capture device to capture digital-media in real-time, recording a stream of geolocations while the device is capturing the digital-media.

In the instance where geolocation-related data cannot be determined from the metadata associated with the current digital-media file or otherwise accessed from the media capture device, block 325 may request the identified user to manually enter the geolocation-related data associated with the current digital-media file. In various embodiments, the identified user may enter GPS coordinate(s), Cartesian coordinate(s), and/or geographic coordinate(s) (e.g., latitude and longitude) associated with the geolocation of the captured digital-media. In some embodiments, the identified user may select a point on an interactive map associated with the geolocation of the captured digital-media. In this instance, the geolocation-related data may be extracted from the selected point on the interactive map by referencing a geographic information system ("GIS") to determine the coordinates of the selected point.

In block 330, routine 300 determines time-related data associated with the current digital-media file. In various embodiments, routine 300 may determine time-related data by obtaining metadata recorded by a media capture device, as similarly discussed with respect to block 325 above. In many embodiments, the time-related data associated with the current digital-media file may be the time and/or date the digital-media was captured. For example, as discussed above, many media capture devices are enabled to record and store time-related data when capturing digital media, and such devices may encode a digital-media file with its associated time-related data. In various embodiments, block 330 may determine time-related data by parsing, or otherwise obtaining, the metadata encoded within tags of the digital-media file when a standard metadata encoding format is used (see discussion above).

In the instance where time-related data cannot be determined from the metadata associated with the current digital-media file or otherwise accessed from the media capture device, in block 330 routine 300 may request the identified user to manually enter the time-related data associated with the current digital-media file. However, in various embodiments, block 330 may allow the media capture device to capture digital-media in real-time, recording a stream of time-related data while the device is capturing the digital-media.

In block 335, routine 300 optionally obtains other metadata associated with the current digital-media file. For example, in various embodiments, other metadata may include metadata such as some or all of the following:

place identification data (e.g., park, coffee shop, residence, and the like);
event identification data (e.g., concert, political event, athletic event, and the like);
media and/or file type (i.e., whether the file is a photo or video, and its file extension);
a user-provided file name, timestamps for the starting and ending points of the media event;
GPS accuracy (e.g., within 10 meters);
data related to a marker image to be used in connection with a graphical media control on the interactive map (e.g., thumbnail image and/or text index to be used);
a URL associated with the current digital-media file;
metadata associated with the media capture device used (e.g., camera model, original resolution, and other like properties);
sharing and/or visibility criteria associated with the current digital-media file (e.g., privacy settings and the like);
a content class associated with the current digital-media file (e.g., adult, family, comedy, and the like); and/or
other like metadata that may be used to categorize and/or characterize the current digital-media file.

In block 340, routine 300 stores the metadata in a searchable metadata data store (e.g., searchable metadata data store 130). In various embodiments, the data store may create a search index in order to facilitate the fast and accurate retrieval of stored metadata associated with the identified user. In such embodiments, the search index may be updated in order to identify the obtained metadata associated with the current digital-media file. Search indices may include a design such as a spatial index and/or any other search index design that may be able to handle geolocation-related criteria, in addition to handling time-related criteria, media-type criteria, and/or social-graph-related criteria. However, in some embodiments, in block 340, routine 300 may store the metadata associated with the current digital-media file without the use of a search index.

In closing loop block 345, routine 300 iterates back to opening loop block 315 to process the next user-selected media file to upload, if any. Once all user selected media files to upload have been processed, routine 300 ends in block 399.

Figure 4:
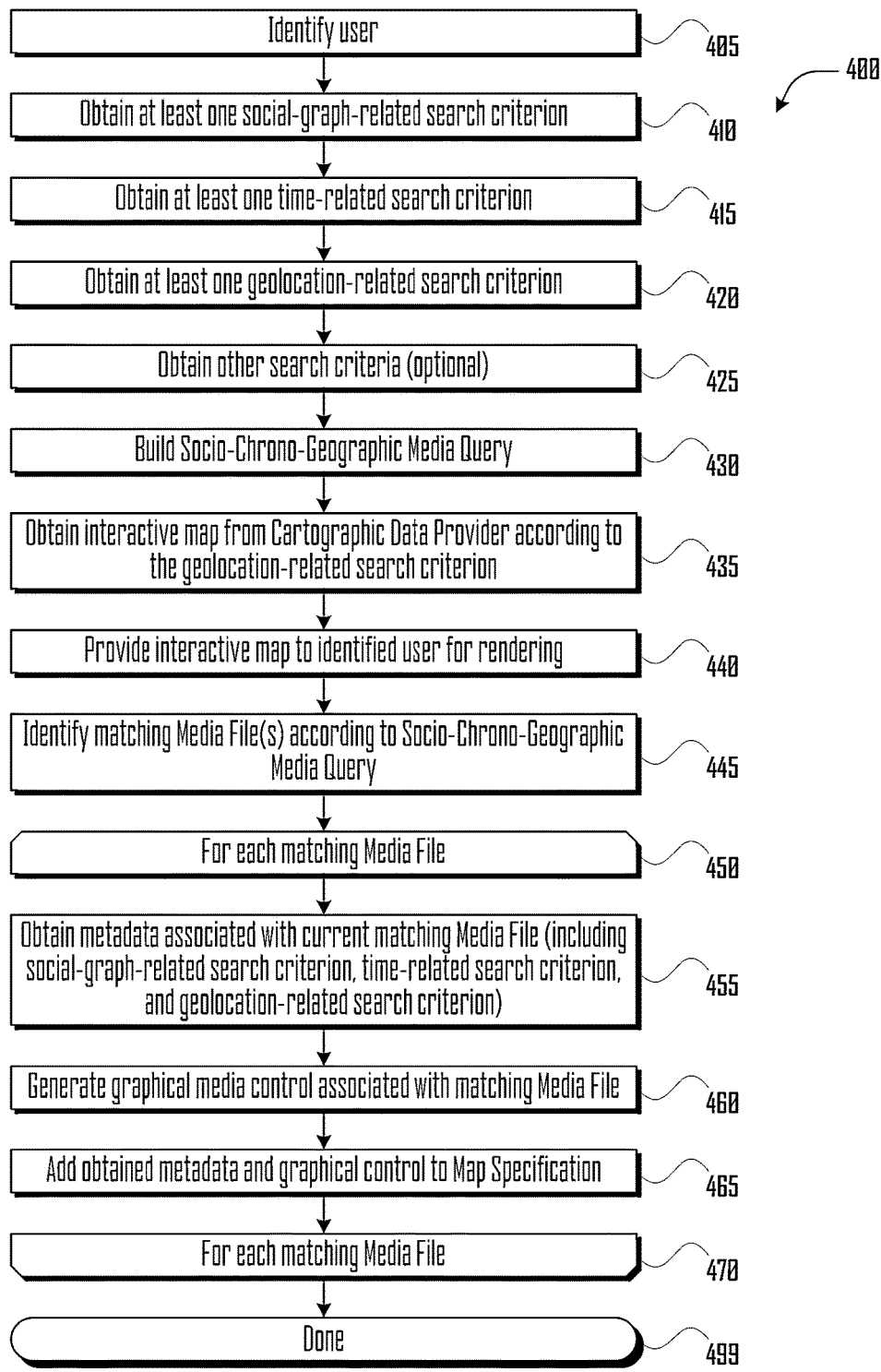
FIG. 4 illustrates an exemplary socio-chrono-geographic media file browsing and cartographic display routine, in accordance with one embodiment.

FIG. 4 shows a routine 400 for browsing digital-media files according to a combination of a social-graph-related criterion, a time-related criterion, and a geographic-related criterion. In block 405, routine 400 identifies and/or authenticates the user who is requesting to browse one or more digital-media files. In many embodiments, identifying and/or authenticating a given user may include collecting personal identifying information (e.g., name, age, place of residence, and the like), social-graph data (e.g., mapping the relationships between users within a given social network), and/or other data that identifies the given user.

For example, in one embodiment, in block 405, routine 400 may obtain from a user device and/or media capture device a user identifier, user/password combination, cookie, certificate, and/or other identity and/or authentication token. In various embodiments, in block 405, routine 400 may identify a user by obtaining user information that is stored in searchable metadata data store 130 (see discussion of FIG. 1 above). In various embodiments, block 405 may identify a user by obtaining user information via a social networking service and/or media sharing service. In other embodiments, the user information may be obtained via another on- or off-line data-collecting interface.

In block 410, routine 400 obtains at least one social-graph-related search criterion. In various embodiments, in block 410, routine 400 obtains at least one social-graph-related search criterion by providing a GUI control for the identified user to input the social-graph-related search criterion. In various embodiments, the social-graph-related search criterion may specify one or more users in the identified user's social network. In various embodiments, social-graph-related search criterion may specify users that are members of a social networking service and/or media sharing service.

In block 415, routine 400 obtains at least one date and/or time-related search criterion. In various embodiments, in block 415, routine 400 obtains at least one date and/or time-related search criterion by providing a GUI control for the identified user to input the date and/or time-related search criterion. In most embodiments, the date and/or time-related search criterion may specify an interval between two end points within a system of measuring temporal positions (i.e., a time range). Therefore, in various embodiments, a date and/or time-related search criterion may specify a time range by indicating two end points in the past (i.e., end points not including the present date and/or time, real-time, and the like). Additionally, in various embodiments, a time-related search criterion may specify multiple time-ranges, each indicating two distinct endpoints.

In various embodiments, the time-related search criterion may specify, at one or both end points, a calendar date (e.g., Jul. 4, 2010; July 4; and the like), a time of day and/or a time zone (e.g., 10:00 AM, 10:00 AM Greenwich Mean Time (GMT), and the like), and/or a combination of calendar dates and/or times of day (e.g., Jul. 4, 2010 at 10:00 AM GMT to Jul. 4, 2011 at 10:00 PM GMT). In various embodiments, the time-related search criterion may specify, at one or both endpoints, one or more dates designated as having special cultural and/or national significance (e.g., Independence Day, Christmas, Ramadan, April Fools' Day, Earth Day, Halloween, and the like).

In block 420, routine 400 obtains at least one geolocation-related search criterion. In various embodiments, in block 420, routine 400 obtains at least one geolocation-related search criterion by providing a GUI control for the identified user to input the geolocation-related search criterion. In various embodiments, the geolocation-related search criterion may specify a predefined geo-political boundary (e.g., a neighborhood, city/municipality, state/province, country, and the like). In various embodiments, the geolocation-related search criterion may specify one or more geographic locations and/or geographic descriptions (e.g., Juan De Fuca Strait, Mount Rainier, the Olympic National Forrest, the Pacific Ocean, and the like).

In accordance with various embodiments, the geolocation-related search criterion may specify a geographic coordinate (e.g., latitude and longitude) and/or a range of geographic coordinates. In various embodiments, a geolocation-related search criterion may specify a Cartesian coordinate (e.g., Universal Transverse Mercator (UTM) coordinate system and/or Universal Polar Stereographic (UPS) coordinate system) and/or a range of Cartesian coordinates. In various embodiments, geolocation-related search criterion may specify a GPS coordinate (e.g., 47.4257, −121.5843; and the like) and/or a range of GPS coordinates.

In some instances, the identified user may wish to browse digital-media files associated with an event that took place at a certain geographic location, and that occurred during a certain time range. In various embodiments, a time-related search criterion and a geolocation-related search criterion may be associated with a named and/or labeled event. In such embodiments, the identified user may use a GUI control to conduct a search based on an event name and/or label in order to browse digital-media files associated with the event. In such embodiments, selecting the event name and/or label may constitute specifying geolocation-related search criterion and time-related search criterion.

For example, in various embodiments, an event may include a social function (e.g., a birthday party, a wedding, a festival, and the like), sporting event (e.g., high school football game, charity golfing event, athlete press conference, and the like), business-related event (e.g., a conference, a seminar, a team building event, and the like), political event (e.g., political rally, a political debate, a protest, and the like), and/or natural phenomena (e.g., a solar eclipse, a hurricane, an animal migration, and the like).

In block 425, routine 400 optionally obtains other search criteria. In various embodiments, in block 425, routine 400 obtains other search criteria by providing a GUI control for the identified user to input the other search criteria, if any. In various embodiments, other search criteria may include digital-media content data, visibility and/or digital-media sharing criteria, digital-media file type, content class of a desired one or more digital-media files, and the like. However, in other embodiments, a user may not have the ability to choose other search criteria.

In block 430, routine 400 builds a socio-chrono-geographic media query according to the social-graph-related search criterion, time-related search criterion, geolocation-related search criterion, and other search criteria (if any), obtained in blocks 410, 415, 420, and (optionally) 425. The socio-chrono-geographic media query may generally be built in a format employed by a database query language and/or an information retrieval query language that may be used in conjunction with a full text search engine and/or a database system (e.g., searchable metadata data store 130). Although any suitable query language may be used, many embodiments may use a query language that is optimized to select records according to geospatial criteria.

In block 435, routine 400 obtains an interactive map according to the at least one geolocation-related search criterion obtained in block 420. In some embodiments, the socio-chrono-geographic media browsing server may obtain an interactive map from the cartographic data provider by supplying a third party cartographic data provider with the obtained geolocation-related search criterion. In such embodiments, the obtained geolocation-related search criterion may be supplied to the cartographic data provider by using a data structure (e.g., parameters to the path and query portions within a web URI, and other like streams of data) according to the format of the cartographic data provider's API and/or other suitable format accepted by the cartographic data provider's API.

In other embodiments, the socio-chrono-geographic media browsing server may perform the functions of the cartographic data provider. In such embodiments, the socio-chrono-geographic media browsing server may generate an interactive map based on the geolocation-related search criterion.

In block 440, routine 400 provides the interactive map for rendering (e.g., routine 400 may send a webpage containing the interactive map to a client device associated with the identified user).

In block 445, routine 400 identifies one or more matching media file(s) according to the socio-chrono-geographic media query. In various embodiments, a search engine may be used to identify matching files according to the socio-chrono-geographic media query (e.g., search engines such as PostGIS provided by the Open Source Geospatial Foundation ("OSGeo") of Phoenix, Ariz.; Apache Lucene provided by the Apache Software Foundation of Forest Hill, Md., as well as Apache Lucene variants such as the open source ElasticSearch project, available at elasticsearch.org; Oracle Spatial provided by Oracle Corp. of Redwood Shores, Calif.; Spatial SQL/MySQL provided by Oracle Corp. of Redwood Shores, Calif.; MongoDB provided by 10gen, Inc. of Redwood Shores, Calif.; and the like). Although any suitable search engine may be used, many embodiments may use a search engine that is optimized to access data according to geospatial criteria.

Beginning in opening loop block 450, routine 400 processes each matching media file in turn. In block 455, routine 400 obtains metadata associated with the current matching media file (including social-graph related search criterion, time-related criterion, and geolocation-related criterion). In various embodiments, the metadata associated with the current matching digital-media file may be obtained from a data storage device associated with the socio-chrono-geographic media browsing server (e.g., searchable metadata data store 130).

In block 460, routine 400 generates a graphical media control associated with the current matching media file. In some embodiments, the graphical media control may be a symbol (e.g., dot, arrow, and the like). In some embodiments, the graphical media control may be a representation of the digital-media file it is associated with (e.g., a thumbnail, icon, pictogram, thumbshot, and the like).

In block 465, routine 400 adds the obtained metadata from block 455 and the generated graphical media control from block 460 to the interactive map. In various embodiments, routine 400 may direct an interactive map sent to a client device associated with the identified user in block 440 to place the generated graphical media control and obtained metadata on the interactive map. In some embodiments, routine 400 may further specify other optional metadata for placement on the interactive map.

In closing loop block 470, routine 400 iterates back to opening loop block 440 to process the next matching media file, if any. Once all matching media files have been processed, routine 400 ends in block 499.

Figure 5:
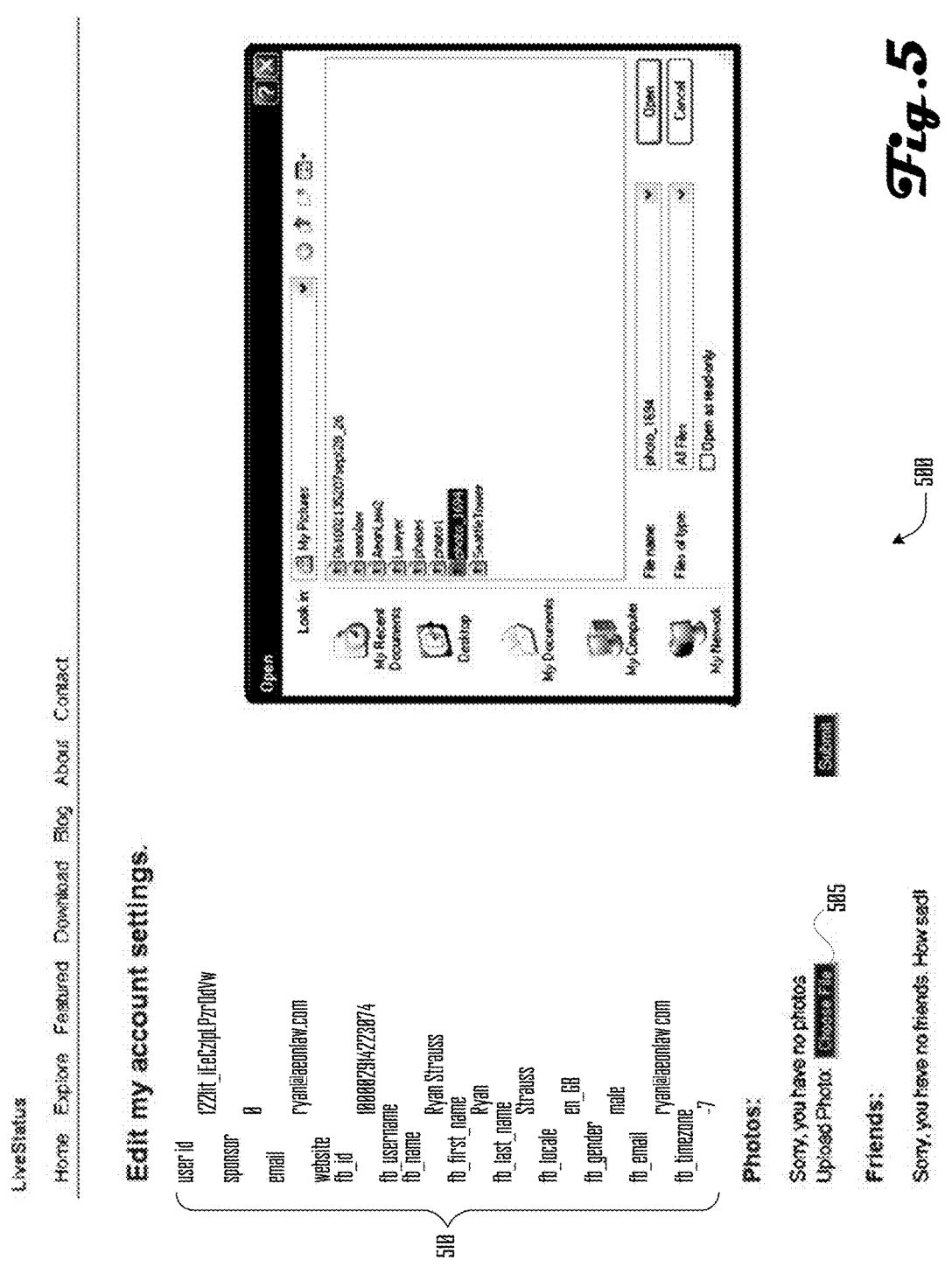

FIG. 5 illustrates an exemplary media file upload GUI 500 displayed in a web browser, in accordance with one embodiment. In various embodiments, media file upload GUI 500 may be displayed on any device that is enabled to display digital-media content (e.g., desktop computers, smartphones, tablet computers, and the like). Media file upload GUI 500 includes media file upload GUI control 505 by which an identified user may indicate the one or more digital-media files that he/she wishes to upload. Additionally, media file upload GUI 500 may display user identification data 510 to the identified user.

Figure 6:
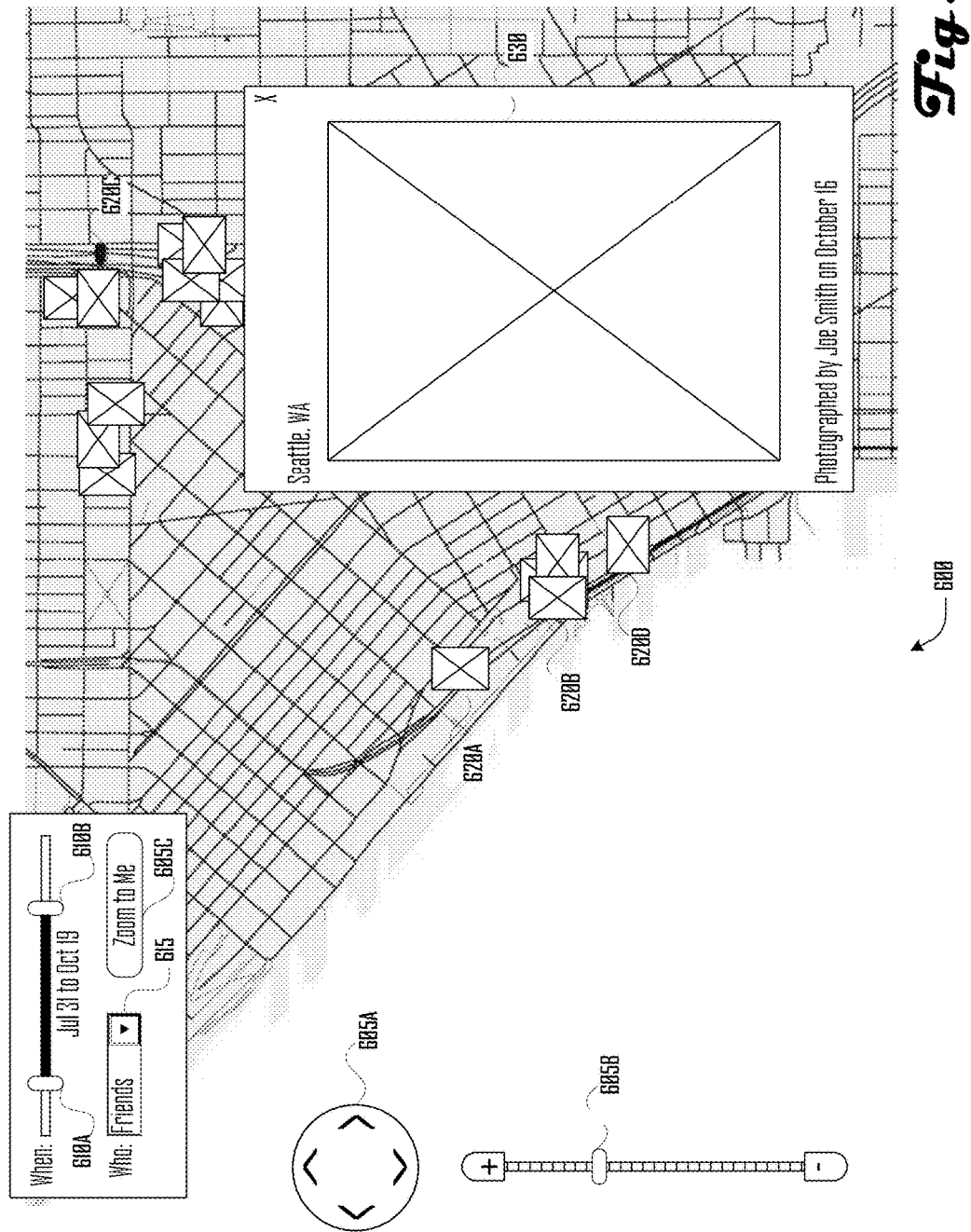
FIG. 6 illustrates an exemplary interactive map employing a socio-chrono-geographic media file browsing system being displayed on user device, in accordance with one embodiment.

FIG. 6 illustrates an exemplary interactive map 600 being displayed in a web browser, in accordance with one embodiment. In various embodiments, interactive map 600 may be displayed on any device that is enabled to display digital-media content (e.g., desktop computers, smart phones, tablet computers, and the like). In various embodiments, interactive map 600 includes geolocation GUI controls 605A-C, time GUI controls 610A-B, social-graph GUI control 615, and graphical media controls 620A-D.

Geolocation GUI controls 605A-C provide the identified user with the ability to input geolocation-related criteria. More specifically, geolocation GUI controls 605A-C allow the identified user to browse digital-media within a specified geolocation area. Geolocation GUI control 605A provides the identified user with the ability to navigate interactive map 600 by allowing the identified user to select one of four directional arrows and reposition interactive map 600 in the direction of the selected arrow. Geolocation GUI control 605B provides the identified user with the ability to browse a desired geolocation area by increasing or decreasing the size of the area being displayed (i.e., "zoom"). Geolocation GUI control 605C provides the identified user with the ability to center interactive map 600 on the geolocation of the identified user's user device and/or mobile capture device, if available. In the example shown by FIG. 6, interactive map 600 shows a geolocation corresponding to a portion of Seattle, Wash.

Time GUI controls 610A-B provide the identified user with the ability to input time-related search criteria. More specifically, time GUI controls 610A-B allow the identified user to browse digital-media files within a desired time range. Time GUI control 610A allows the identified user to input a first time range endpoint, while 610B allows the identified user to input the second time endpoint. When both endpoints are set, interactive map 600 displays graphical medial controls 620A-D associated with digital-media files corresponding to the selected time range. In the example shown by FIG. 6, time GUI control 610A is set to July 31, time GUI control 610B is set to October 19, and interactive map 600 is displaying graphical medial controls associated with digital-media files associated with a date including, and falling in between, the endpoints July 31 and October 19.

Social-graph GUI control 615 provides the identified user with the ability to input social-graph-related search criteria. More specifically, social-graph GUI control 615 allows the identified user to browse digital-media files associated with one or more other users in the identified user's social-graph. In the example shown by FIG. 6, social-graph GUI control 615 is set to a group labeled "friends", whereby interactive map 600 displays the graphical media controls associated with users listed in the group "friends". In various embodiments, social-graph GUI control 615 may be set to one other user within the identified user's social-graph. Additionally, in various embodiments, social-graph GUI control 615 may be set to one or more combinations of users within the identified user's social-graph.

Graphical media controls 620A-D provide the identified user with the ability to select digital-media files for display. More specifically, by selecting one or more of the graphical media controls 620A-D, the identified user may display the selected digital-media file in an overlay such as overlay 630.

In the example shown by FIG. 6, graphical media controls 620A-C are reduced-sized versions of the digital photographs that they represent (e.g., thumbnails). Upon selecting any one of the graphical media controls 620A-C, the digital-photograph being represented is displayed to the identified user (see e.g., overlay 630). In other embodiments, graphical media controls 620A-C may comprise graphical representations that are not reduced-sized versions of the digital-media files they represent (e.g., icons, thumbshots, and the like).

For example, in one embodiment, a graphical media control may depict a logo (e.g., a "YouTube" logo provided by Google, Inc. of Menlo Park, Calif.) or icon associated with a media type (e.g., digital video). Upon selecting such a graphical media control, a digital-video (e.g., supplied by YouTube.com) may be displayed to the identified user. In various embodiments, selecting graphical media control 620D may display a video overlaid on top of interactive map 600 (similar to overlay 630). In various embodiments, a graphical media control may represent a link that the identified user may follow to a third-party website (e.g., YouTube.com) in order to view the selected digital video.

Although specific embodiments have been illustrated and described herein, a whole variety of alternate and/or equivalent implementations may be substituted for the specific embodiments shown and described without departing from the scope of the present disclosure. This application is intended to cover any adaptations or variations of the embodiments discussed herein.

The invention claimed is:

1. A computer implemented method for obtaining digital-media content, the method comprising:
obtaining, by the computer from a remote media capture device, a current location of said remote media capture device, a social-graph related selection associated with said remote media capture device and a temporal related selection associated with said remote media capture device;
generating, by the computer, a media query based on a geographic region centered at said current location of said remote media capture device, said social-graph related selection associated with said remote media capture device and said temporal related selection associated with said remote media capture device;
identifying, by the computer, a plurality of matching media files, including a first media file, according to said media query by:
obtaining a geolocation-related search criterion and a time-related search criterion both by allowing an identified user to select an event name via the remote media capture device; and
identifying said first media file and a second media file as said plurality of matching media files by conducting a search based on the event name;
determining, by the computer, a geographic location associated with said first media file, said geographic location associated with said first media file being within said geographic region;
obtaining, by the computer, a route between said current location of said remote media capture device and said geographic location associated with said first media file;
determining, by the computer, a provider of said first media file;
generating, by the computer, a first graphical media control associated with said first media file, wherein said first graphical media control is a logo that is associated with said provider of said first media file and that is to be placed on an interactive map of said geographic region at said geographic location associated with said first media file;
providing, by the computer to said remote media capture device, said interactive map of said geographic region; and
providing, by the computer to said remote media capture device, said first graphical media control and said route for placement on said interactive map with said first graphical media control being placed at said geographic location associated with said first media file to enable selective presentation of said first media file.

2. The method of claim 1, wherein providing said interactive map comprises obtaining, from a cartographic-data provider, an interactive map associated with said geographic region.

3. The method of claim 1, wherein said temporal related selection indicates a date and/or time interval beginning and ending prior to a current date and/or time.

4. The method of claim 1, further comprising:
obtaining an uploaded media file from said remote media capture device;
determining a geographic location and a date and/or time associated with said uploaded media file; and
associating said uploaded media file with said remote media capture device, said determined geographic location, and said determined date and/or time in a searchable metadata data store.

5. The method of claim 4, wherein identifying said plurality of matching media files comprises querying said searchable metadata data store according to said media query.

6. The method of claim 1, wherein said first graphical media control is selectively associated with users in a user group identified with said social-graph related selection.

7. The method of claim 1, wherein said first graphical media control is selectively associated only with a single user identified with said social-graph related selection and not with one or more other users in a user group identified with said social-graph related selection.

8. The method of claim 1, wherein said first graphical media control is a thumbnail of a digital photograph it represents.

* * * * *